(12) United States Patent
Tewari et al.

(10) Patent No.: US 10,904,123 B2
(45) Date of Patent: Jan. 26, 2021

(54) TRACE ROUTING IN VIRTUAL NETWORKS

(71) Applicant: MICROSOFT TECHNOLOGY LICENSING, LLC, Redmond, WA (US)

(72) Inventors: Rishabh Tewari, Sammamish, WA (US); Michael Czeslaw Zygmunt, Bellevue, WA (US); Madhan Sivakumar, Seattle, WA (US); Deepak Bansal, Bellevue, WA (US); Shefali Garg, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/428,557

(22) Filed: May 31, 2019

(65) Prior Publication Data

US 2020/0382399 A1 Dec. 3, 2020

(51) Int. Cl.
*G06F 11/00* (2006.01)
*H04L 12/26* (2006.01)

(52) U.S. Cl.
CPC .......... *H04L 43/10* (2013.01); *H04L 43/0805* (2013.01)

(58) Field of Classification Search
CPC ............................ H04L 43/10; H04L 43/0805
USPC ................................ 370/329, 330, 252, 254
See application file for complete search history.

(56) References Cited

U.S. PATENT DOCUMENTS

| | | | | |
|---|---|---|---|---|
| 9,344,320 B1* | 5/2016 | Volkman | ............... | H04L 69/164 |
| 9,912,566 B1* | 3/2018 | Penno | .................... | H04L 43/10 |
| 10,103,962 B1* | 10/2018 | Volkman | ................. | H04L 69/28 |
| 2014/0233918 A1* | 8/2014 | Roberts, Jr. | .......... | G11B 27/105 |
| | | | | 386/285 |
| 2015/0244617 A1* | 8/2015 | Nakil | ................... | H04L 41/0631 |
| | | | | 709/224 |
| 2018/0278514 A1* | 9/2018 | Chadha | ................ | H04L 47/286 |

(Continued)

FOREIGN PATENT DOCUMENTS

WO 2013184846 A1 12/2013

OTHER PUBLICATIONS

"International Search Report and Written Opinion Issued in PCT Application No. PCT/US20/029170", dated Jun. 16, 2020, 17 Pages.

(Continued)

*Primary Examiner* — Chuong T Ho
(74) *Attorney, Agent, or Firm* — Newport IP, LLC; Han Gim

(57) ABSTRACT

A route tracing request packet is generated comprising a time-to-live value, a source address of a source of the route tracing request packet, and an address of a destination of the route tracing request packet. The source and destination are in the virtual network; the route tracing request packet is usable to identify the virtual appliance, and the virtual appliance is configured to examine the route tracing request packet for a time-to-live value indicating that the route tracing request packet has expired and sending a time-to-live exceeded message to the source address. The time-to-live exceeded message comprises an identifier for the virtual appliance. The route tracing request packet is forwarded to the destination. The time-to-live exceeded message is received. Data is extracted to determine network virtual appliances that were traversed by the route tracing request packet prior to expiration of the time-to-live. The network virtual appliances are reported.

20 Claims, 9 Drawing Sheets

(56) References Cited

U.S. PATENT DOCUMENTS

2019/0349444 A1\* 11/2019 Cahill ................... H04L 69/16
2020/0127920 A1\* 4/2020 Miao ...................... H04L 45/20

OTHER PUBLICATIONS

Sherwood, et al., "Touring the Internet in a TCP Sidecar", In Proceeding of the Internet Measurement Conference, Oct. 25, 2006, pp. 339-344.

\* cited by examiner

TRACE ROUTING IN VIRTUAL NETWORKS

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines ("VM") that appear and operate as independent computer devices to a connected user. The data center can create, maintain or delete virtual machines in a dynamic manner.

When the data center experiences network connectivity issues, poor network performance may result, resulting in lost data, or users being unable to provide quality services to their downstream customers, which may result in lost revenue and customer dissatisfaction. Troubleshooting network connectivity issues may be difficult to perform given the complexity of the networks in data centers. Production loss and inefficiencies with respect to computing resources can be exacerbated when the data center is unable to quickly isolate and correct the cause of a connectivity issue.

It is with respect to these considerations and others that the disclosure made herein is presented.

SUMMARY

Software Defined Networking (SDN) allows a user of cloud-based computing and storage services to set up virtual networks and configure virtual network devices such as firewalls to the user's virtual network. However, troubleshooting such virtual networks can be difficult. While a traceroute function can be useful in physical networks to discover hops and respective latencies between endpoints, the traceroute function is not currently able to discover virtual network devices in virtual networks. The disclosed embodiments describe technologies for data centers to diagnose network connectivity issues in such virtual networks that may lead to poor network performance in the data center. This may allow data centers to more effectively adhere to operational objectives and at the same time improve operating efficiencies.

In many data centers, link issues may cause delays or drops of data packets. Such issues can have a negative impact on performance and the user experience, and may be difficult to isolate. As traffic bandwidth increases and the data center scale grows, detecting and fixing these faulty links are becoming even more important. At the same time, identifying such links can be difficult, especially in virtual networks where a user has implemented a network virtual appliance, such as a firewall virtual machine or a load balancer. When troubleshooting, not all personnel may be aware of all of the virtual appliances that have been implemented. When delays are detected between virtual machines, or when such delays are transient, it may be difficult to isolate the fault when the exact layout including virtual appliances is not known. Furthermore, existing traceroute functions typically are not able to include such virtual appliances in the hop-to-hop analysis. Unfocused attempts to collect link data may result in a large amount of data that must be processed, potentially without generating any actionable intelligence.

End-to-end network diagnostics in a datacenter providing virtual network services can thus be difficult and costly. In addition to the virtual appliances, there may be multiple physical routers/switches and end hosts involved, making it more difficult to diagnose where packet loss is occurring. With the complex topologies that are commonly implemented in data centers, there are multiple network paths and a number of devices/hops involved in any network communication. Any device/hop may drop packets intermittently. Attempts to find the intermittent device/interface may involve performing packet capture hop by hop, or by turning links off one by one to isolate the offending device. For example, an administrator may have to enable packet capture hop by hop on each of the switches and then correlate the captured traffic from different hops. Enabling packet capture hop by hop can be time consuming and may require that the operator have knowledge of the path that the traffic will take. Additionally, packet drop counters may not be targeted for any particular traffic of interest. Troubleshooting such issues can be time consuming, error prone, and risky. It can also be labor-intensive as the network operator may need to access each and every device and enable packet capture. The packet drop counters on router/switches are typically not specific enough for a given flow, thus not allowing for the identification of the source of the issue if the issue does not have a broad impact and only impacts a subset of a dataflow. The data center can thus spend a considerable amount of time and effort attempting to isolate link faults, which can lead to extensive and unnecessary consumption of computing resources.

In various embodiments, methods and systems are disclosed for implementing traceroute functionality in a virtual network environment. In an embodiment, a virtual network traceroute function (which may be referred to as a VN traceroute) may be configured to identify virtual network appliances such as firewall virtual machines, load balancers, and virtual switches that are configured in between endpoints. In one embodiment, a network management agent may be implemented and executed on virtual endpoints as well as virtual appliances. The network management agent may be configured to send and receive Internet Control Message Protocol (ICMP)-type packets that include a time-to-live (TTL) counter that is set by the network management agent on the source endpoint. The virtual appliances may be configured by the network management agent to detect the ICMP-type packets, decrement the TTL counter, and forward or return the packets based on the TTL value.

In some embodiments, an API may be implemented that allows users to request a traceroute between virtual endpoints and return a report of all discovered virtual hops between the endpoints and associated latencies between the hops. The ICMP-type packets may be intercepted before entering the network and modified to expose the TTL. In some embodiments, techniques may be implemented to include discovery of physical hops (e.g., top-of-rack (TOR) (tier 0) and middle-of-rack (MOR) (tier 1) devices between virtual hops that allow for network-side analysis of packet routing.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following Detailed Description describes technologies for diagnosing network connectivity issues in data centers, including those that provide virtualized services and implement virtual networks. In such networks it may be difficult to capture information to troubleshoot and identify network issues. Such networks may comprise many virtual and physical network devices such as load balancers, switches, and other network appliances. In some cases, mirroring techniques, where a copy of packets are sent to a network monitoring device, may increase network traffic which may cause performance issues. Furthermore, the effort to analyze and review the mirrored traffic can be significant as the volume of mirrored traffic increases.

In various embodiments, techniques are disclosed for implementing traceroute functionality in a virtual network environment. In an embodiment, a virtual network traceroute function (which may be referred to as a VN traceroute) may be configured to identify virtual network appliances such as firewall virtual machines, load balancers, and virtual switches that are configured in between endpoints. In one embodiment, a network management agent may be implemented and executed on virtual endpoints as well as virtual appliances. The network management agent may be configured to send and receive Internet Control Message Protocol (ICMP)-type packets that include a time-to-live (TTL) counter that is set by the network management agent on the source endpoint. The virtual appliances may be configured by the network management agent to detect the ICMP-type packets, decrement the TTL counter, and forward or return the packets based on the TTL value.

In some embodiments, an API may be implemented that allows users to request a traceroute between virtual endpoints and return a report of all discovered virtual hops between the endpoints and associated latencies between the hops. The ICMP-type packets may be intercepted before entering the network and modified to expose the TTL. In some embodiments, techniques may be implemented to include discovery of physical hops (e.g., top-of-rack (TOR) and middle-of-rack (MOR) devices) between virtual hops that allow for network-side analysis of packet routing.

Figure 2:
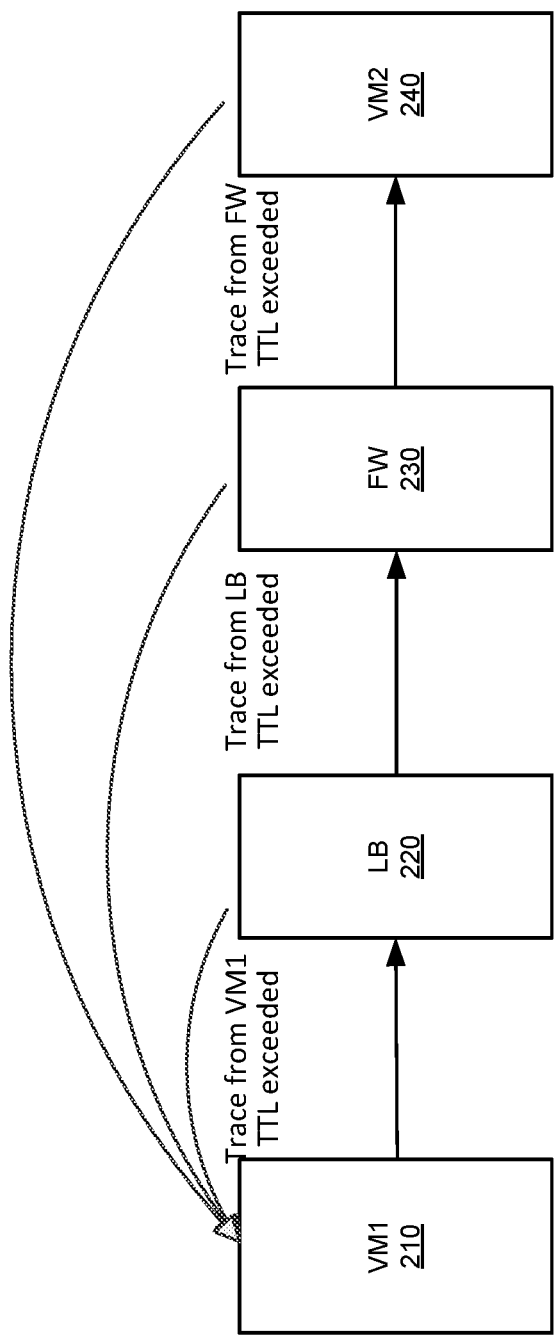
FIG. 2 is a diagram illustrating an example of a traceroute function in accordance with the present disclosure.

In general, a traceroute function is an example of a network diagnostic function that can be used to identify the network path that a data packet takes from a source node to a destination node. An example is illustrated by system 200 in FIG. 2. The traceroute function typically lists the intermediate network devices between virtual machines 210 and 240 (e.g., load balancer 220, virtual firewall 230, and other virtual appliances) that the data packet passes through until either the packet reaches its destination or fails to reach its destination and is discarded. In addition, the traceroute function typically collects information for the elapsed time taken for each hop from network device to network device. The host may thus be able to identify how the source and destination nodes are connected to each other and the latencies involved for each hop.

The traceroute function operates by causing each network device along a network path to return a message such as an ICMP (Internet Control Message Protocol) message. A packet typically contains a time-to-live (TTL) value which specifies how many hops that the packet can traverse before it expires. Each time a packet passes through a network device, its TTL value is decremented by one, and if the TTL value reaches zero, the packet is discarded and a TTL Exceeded message is returned to the source node. In one example, the traceroute function may operate by initially sending a packet with a TTL value of one. The first network device along the path decrements the TTL to zero and discards the packet because the TTL has expired, and returns a TTL Exceeded message. The traceroute function identifies this network device as the first network device on the path to the destination. The traceroute function may then send a packet with a TTL value of two.

The first network device along the path decrements the TTL to one and forwards the packet to the next network device in the path. The second network device along the path decrements the TTL to zero and discards the packet because the TTL has expired, and returns a TTL Exceeded error message. The traceroute function may identify this network device as the second network device on the path. The traceroute utility sends additional packets with a TTL of three, and then four, and so on, causing each network device along the path to return a TTL Exceeded message and thus discovering the intermediate network devices in the path until either the final destination is reached or the maximum TTL value is reached and the traceroute ends. The timestamp values returned for each router's TTL Exceeded message may be used to determine the latency values. The traceroute function typically operates over Internet Protocol (IP) networks using IP datagrams. In some embodiments the traceroute utility may send an ICMP Echo Request packet.

Figure 1:
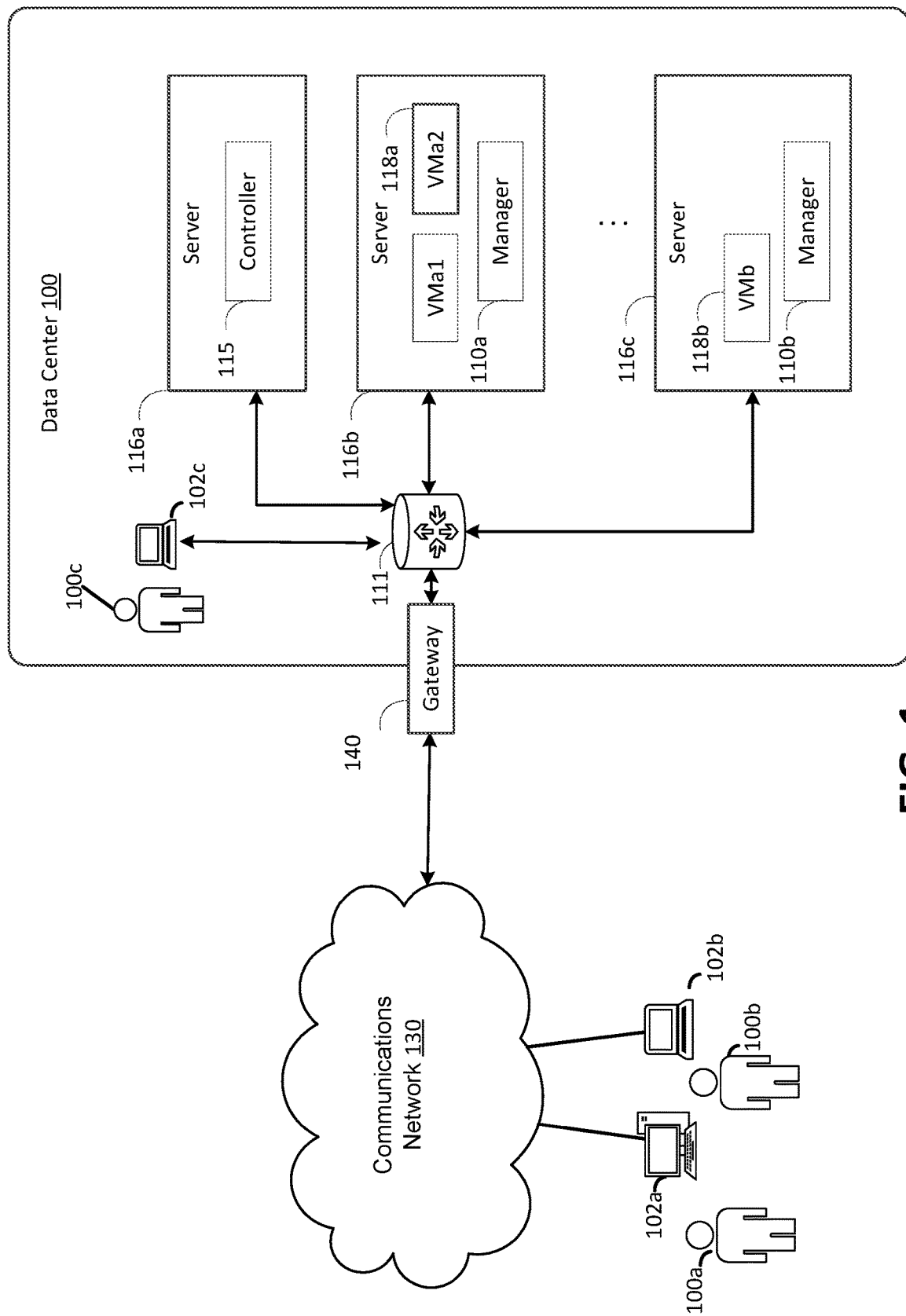
FIG. 1 is a diagram illustrating a data center in accordance with the present disclosure.

FIG. 1 illustrates an example computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred to herein singularly as "a manager 120" or in the plural as "the managers 120") configured to execute the virtual machines. The managers 120 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 3:
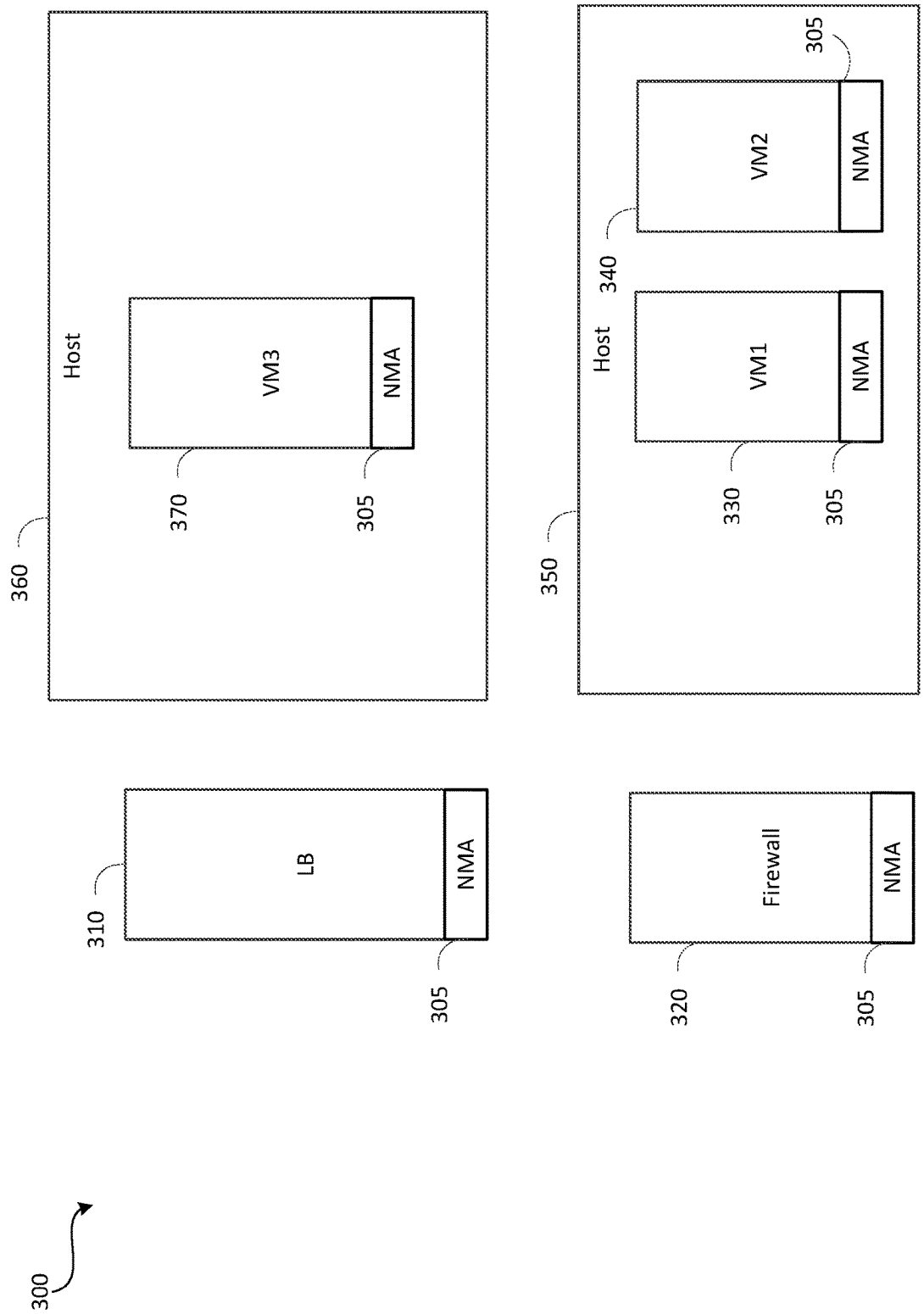
FIG. 3 is a diagram illustrating a system diagram in accordance with the present disclosure.

FIG. 3 illustrates an example system 300 for implementing a traceroute function in virtual network context. In one embodiment, the architecture may be deployed alongside other applications on each end-host as a user-level process running in the host OS. In one example, network monitoring agents 305 may be implemented for load balancer 310, firewall 320, virtual machines 330 and 340 instantiated on host 350, and virtual machine 370 instantiated on host 360. The network monitoring agent 305 may be configured to initiate transmission of a VM traceroute packet. The network monitoring agent 305 may further be configured to detect that a VM traceroute packet has been received, and to decrement the TTL. The network monitoring agent 305 may be configured to return the VM traceroute packet when the decremented TTL is zero, or forward the VM traceroute packet when the decremented TTL is greater than zero. In response to receiving a returned VM traceroute packet at the source, the network monitoring agent 305 may be configured to identify the path taken to the destination based on the information returned in the VM traceroute packet.

In some embodiments, the network monitoring agent 305 may be configured to perform various network diagnosis functions and identify problematic links. The problematic links may be determined based on identified virtual appliances and information received from the hops. The diagnosis may be based on network link path latency information for one or more network paths in the networked computing environment. The existence of a probable faulty component may be determined based on the network link path latency information. In response to the determination, links or appliances associated with the probable faulty component may be identified.

Figure 4:
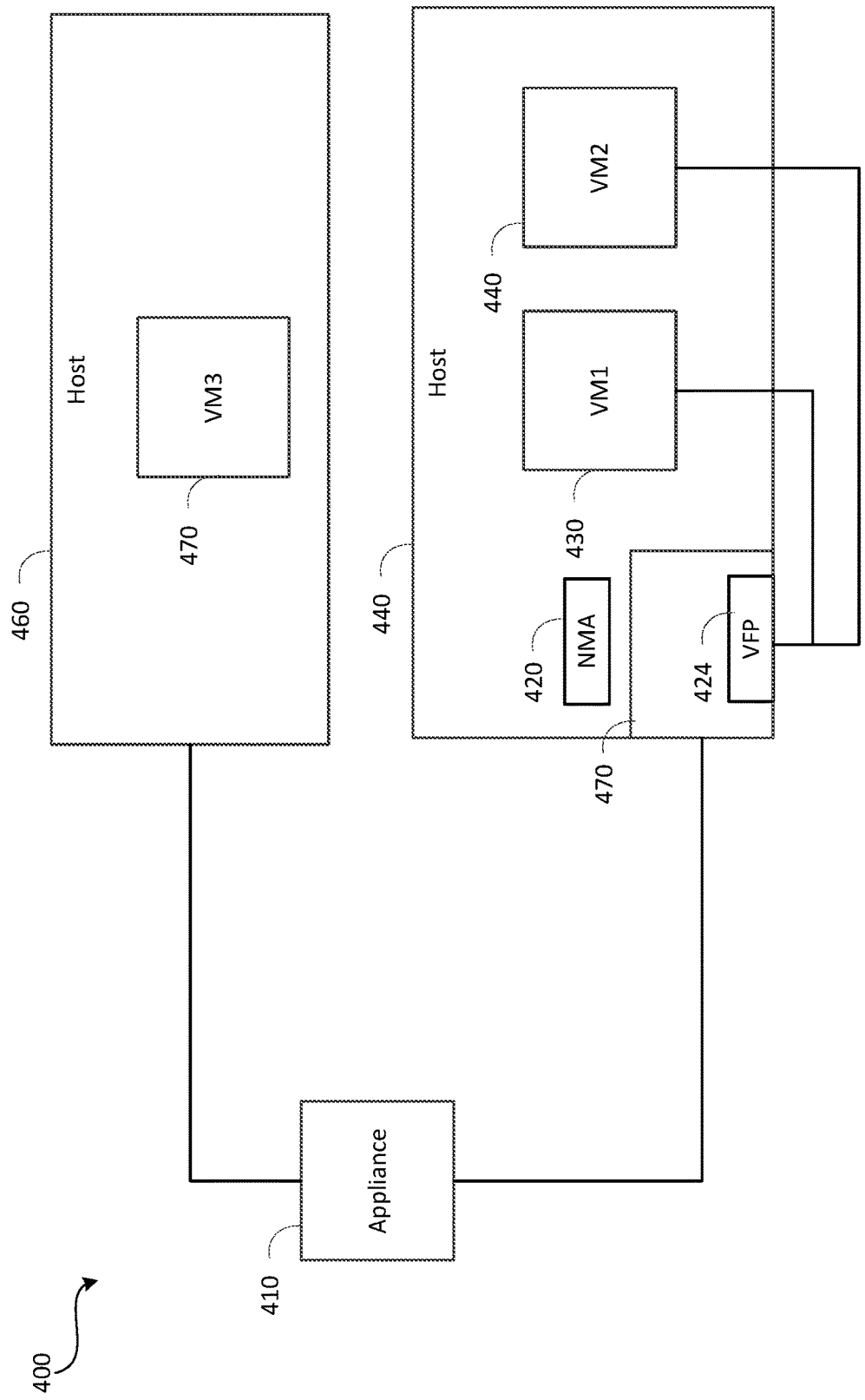
FIG. 4 is a diagram illustrating a system diagram in accordance with the present disclosure.

FIG. 4 illustrates an example system in which the network management agent 420 is implemented on a host. For example, the network management agent 420 may be implemented in conjunction with a host switch. In one embodiment, the network management agent may be implemented at a host 450 including virtual machines 430 and 440. In one embodiment, host 450 may run a virtual switch 480 which connect virtual machines 430 and 440 to virtual networks and the physical network. A networking stack may be implemented, and a virtual filtering platform (VFP) 424 may be implemented with multiple ports that are connected to the external network. The virtual filtering platform 424 reside in a virtualization function such as switch 480, and may perform a number of functions including virtual switching, applying policies of the virtualization environment to a packet, parse packets and create unified flows, and offload flows as needed. In one implementation, virtual filtering platform 424 may filters packets and apply network policies. The virtual filtering platform 424 may apply policies to data traffic from external sources. In an embodiment, the virtual filtering platform 424 may initiate and inject the VN traceroute packets. The virtual filtering platform 424 may receive instructions from the network management agent 420 that is configured to manage execution of the traceroutes.

In order to accurately identify the path taken by a user's data through their virtual network, the traceroute packets should appear to be an actual packet. Thus the packet structure and the packet header information should appear to be an actual user packet, including the source and destination information and any encapsulation that is normally added to the packet. For example, the user network may define user-defined routes for handling user traffic as well rules for firewalls and other appliances. As used herein, the disclosed traceroute function for identifying routes in a virtual network may be referred to as a virtual network traceroute or VN traceroute. The VN traceroute may be configured to identify all virtual nodes, including virtual appliances, that are traversed by a packet originating or arriving at a virtual network.

The network management agent that is implemented in the virtual machines and appliances may be configured to inject VN traceroute packets into the data packet flows. The packets may be inserted at the VFP with a TTL value. Downstream virtual appliances with a network management agent may receive the VN traceroute packets and recognize the packet as a VN traceroute packets. In some embodiments, the VN traceroute packets may be identified using unused bits in the packet header. For example, the DSCP field in the IP header may be used to identify the VN traceroute packets. The next virtual appliance in the data may thus recognize the VN traceroute packet and decrement the TTL. The network management agent may insert information that identifies the virtual appliance and either return the VN traceroute packet to the originating source, if the TTL is zero after decrementing, or forward the VN traceroute packet to the next virtual hop if the TTL is greater than zero. This same procedure can be implemented by each virtual appliance and virtual machine that receives the VN traceroute packet. In this way, the VN traceroute packets are inserted outside the virtual machine and thus is not observable by the user.

Figure 5:
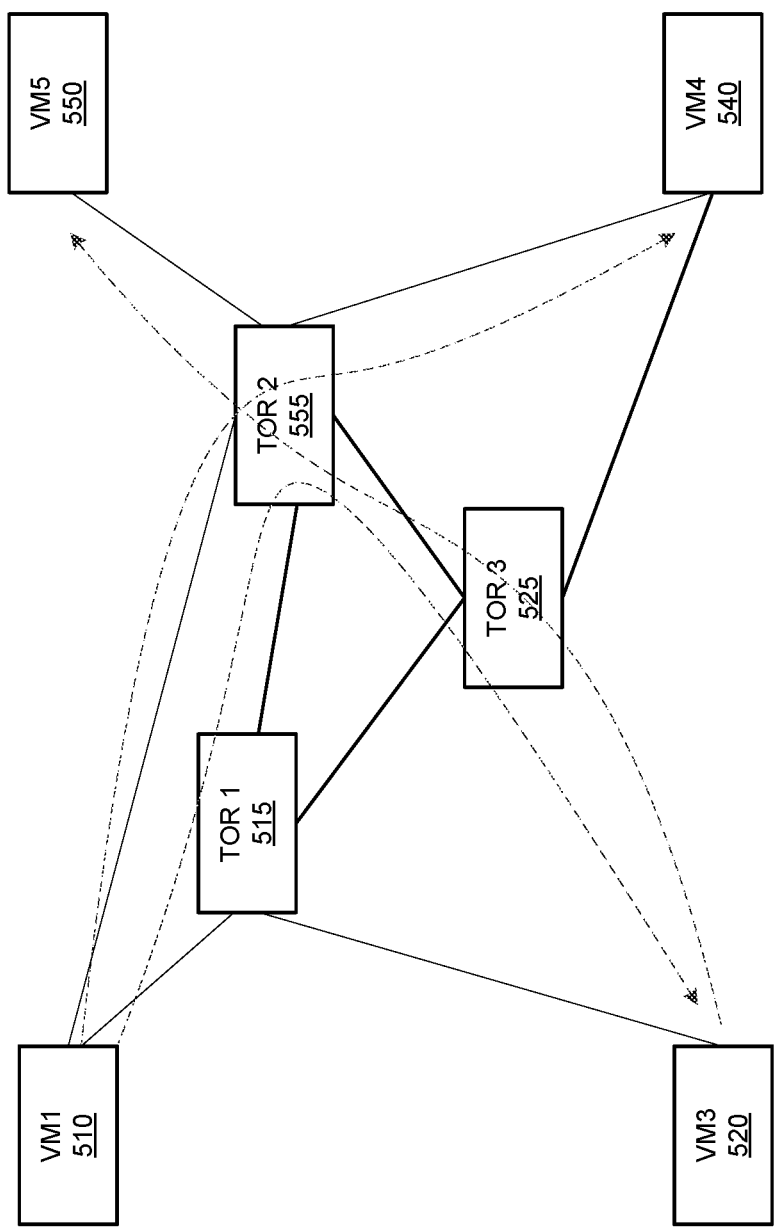
FIG. 5 is a diagram illustrating an example data flow in accordance with the present disclosure.

In some embodiments, it may be desirable to implement traceroutes to learn physical network elements that are traversed by a packet. FIG. 5 illustrates one example of implementing traceroutes in a virtual network to discover a physical path taken by data traffic. In one example, the latency from Virtual machine 1 510 to Virtual machine 3 520 as indicated by traceroutes may be 400 microseconds. The latency from Virtual machine 3 520 to Virtual machine 5 550 as indicated by traceroutes may be 400 microseconds, and the latency from Virtual machine 1 510 to Virtual machine 4 540 as indicated by traceroutes may be 400 microseconds. Because of the high observed latency of 400 microseconds from Virtual machine 1 to Virtual machine 4, as well as from Virtual machine 3 to Virtual machine 5, the common link is TOR 2 555, because packets from Virtual machine 1 510 to Virtual machine 4 540 includes TOR 2 555, and packets from Virtual machine 3 520 to Virtual machine 5 550 include TOR 3 525 and TOR 2 555. Thus, TOR 2 555 may be identified as a potential problem. The link from Virtual machine 1 510 to TOR 2 555 may also be investigated due to the link being a part of the path from Virtual machine 1 510 to Virtual machine 3 520 which is seen to have a high latency of 400 microseconds.

In order to accurately identify physical network elements that are traversed by a packet in a virtual network, the VN traceroute packet should be nearly identical to an actual packet with all the modifications that the programmed Software Defined Network (SDN) performs on the packet. For example, the packet should have modifications made by the VFP driver based on its implemented rules. This may avoid issues with assuming what transpositions and modifications will be performed by the SDN. In an embodiment, an actual packet may be generated for the user associated with the SDN. The generated packet may be "intercepted" after it traverses the VFP. The packet will thus be an actual packet that would have been sent out over the network. The intercepted packet may then be identified by marking the packet as a VN traceroute packet, and modified with a TTL to discover the traversed physical devices. Next hop selection for physical devices (such as the TOR) may depend on the content of the packet, and thus if the content is different in any way from an actual user packet, the packet may be forwarded by the TOR to the destination using a different circuit or TOR as the next hop.

The VN traceroutes can be executed in response to a request, such as an API call. The VN traceroutes can also be executed automatically or in response to an event or trigger. The determination of when to trigger the VN traceroutes may be based on the observed latencies in the network. The determination may also be based on one or more factors. For example, the length of transmit queues may be tracked and the VN traceroutes may be avoided or delayed when the queue size is large. The trigger may be based on observations of a selected subset of transactions, such as the top N % of transactions. Additionally, the triggering of VN traceroutes may be based on current bandwidth and expected transmission times, as well as the length of the routes associated with a given latency observation.

While many of the described examples are illustrated in the context of analyzing infrastructure traffic such as connections to services such as storage, the described techniques may be used in other contexts as well.

Figure 6:
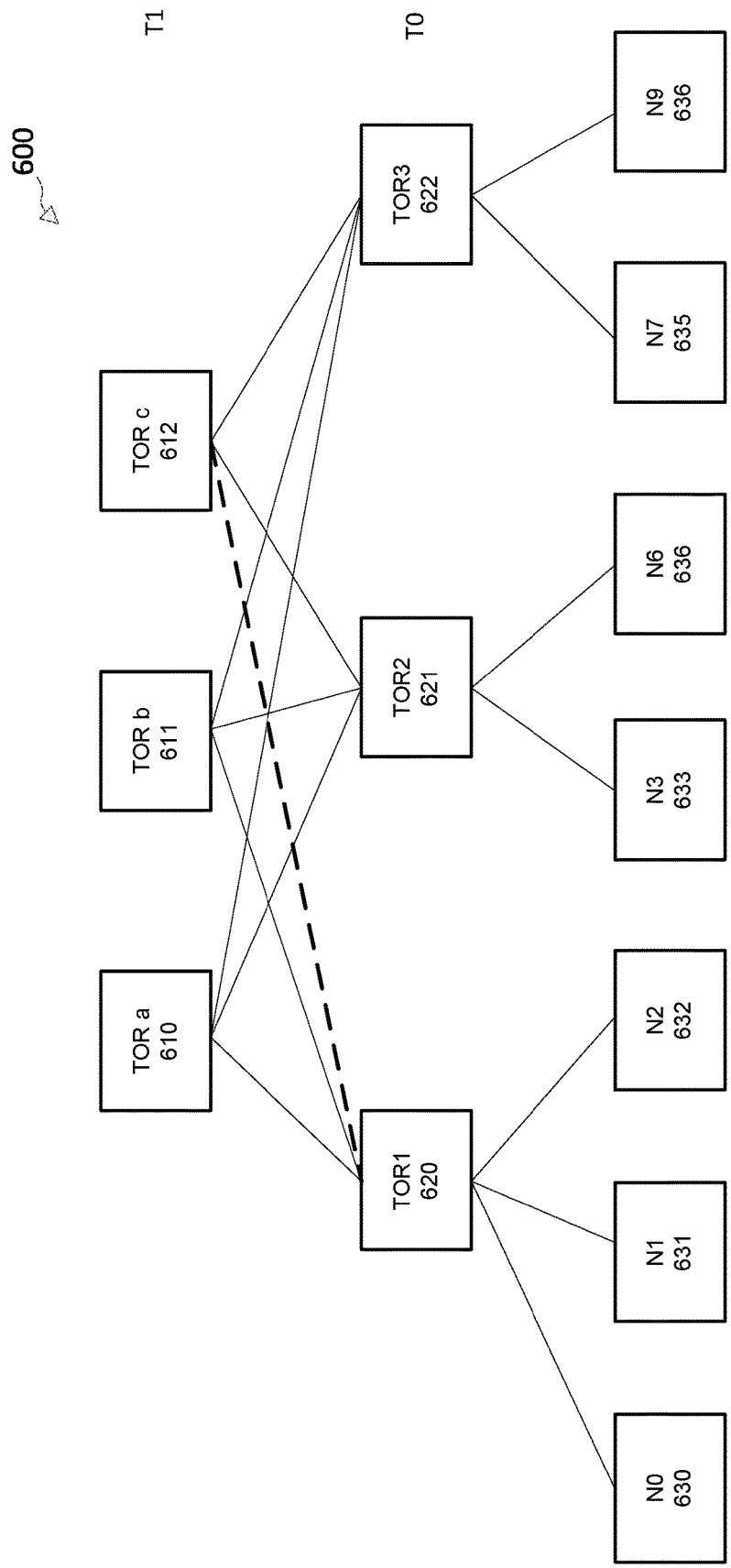
FIG. 6 is a diagram illustrating an example data flow in accordance with the present disclosure.

FIG. 6 illustrates an example networked environment 600 where packet drops are manifested between TOR1 620 and TOR c 612. As shown, multiple connections between network components result in multiple paths between two given nodes. Packet drops between TOR1 620 and TOR c 612 may result in latencies that may be detected by VN traceroutes originating from at least nodes N0 630, N1 631, and N2 632.

Figure 7:
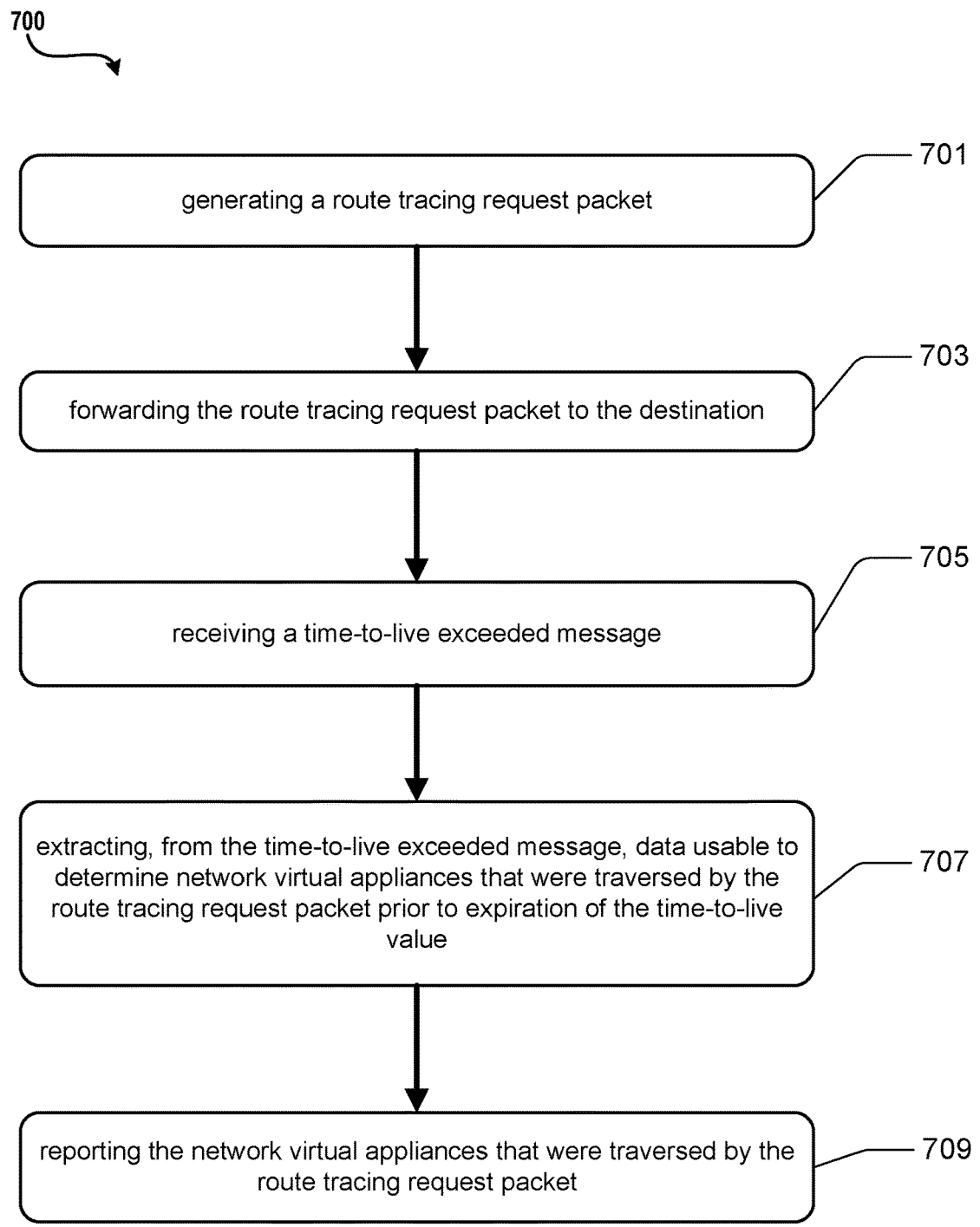
FIG. 7 is a flowchart depicting an example procedure for diagnosing network issues in accordance with the present disclosure.

Turning now to FIG. 7, illustrated is an example operational procedure for analyzing a virtual network comprising at least one virtual appliance in accordance with the present disclosure. Such an operational procedure may provide for identifying faulty links and can be provided by functions illustrated, for example, in FIGS. 1-6. The operational procedure may be implemented in a system comprising one or more computing devices. Referring to FIG. 7, operation 701 illustrates generating a route tracing request packet comprising a time-to-live value, a source address of a source of the route tracing request packet, and an address of a destination of the route tracing request packet. In an embodiment, the source and destination are in the virtual network. Additionally, the first route tracing request packet is usable to identify the at least one virtual appliance. In an embodiment, the at least one virtual appliance is configured to examine the route tracing request packet for a time-to-live value indicating that the route tracing request packet has expired and send a time-to-live exceeded message to the source address. In an embodiment, the time-to-live exceeded message includes an identifier for the at least one virtual appliance.

Operation 701 may be followed by operation 703. Operation 703 illustrates forwarding the route tracing request packet to the destination.

Operation 703 may be followed by operation 705. Operation 705 illustrates receiving the time-to-live exceeded message from the at least one virtual appliance.

Operation 705 may be followed by operation 707. Operation 707 illustrates extracting, from the time-to-live exceeded message, data usable to determine network virtual appliances that were traversed by the route tracing request packet prior to expiration of the time-to-live value.

Operation 707 may be followed by operation 709. Operation 709 illustrates reporting the network virtual appliances that were traversed by the route tracing request packet.

Figure 8:
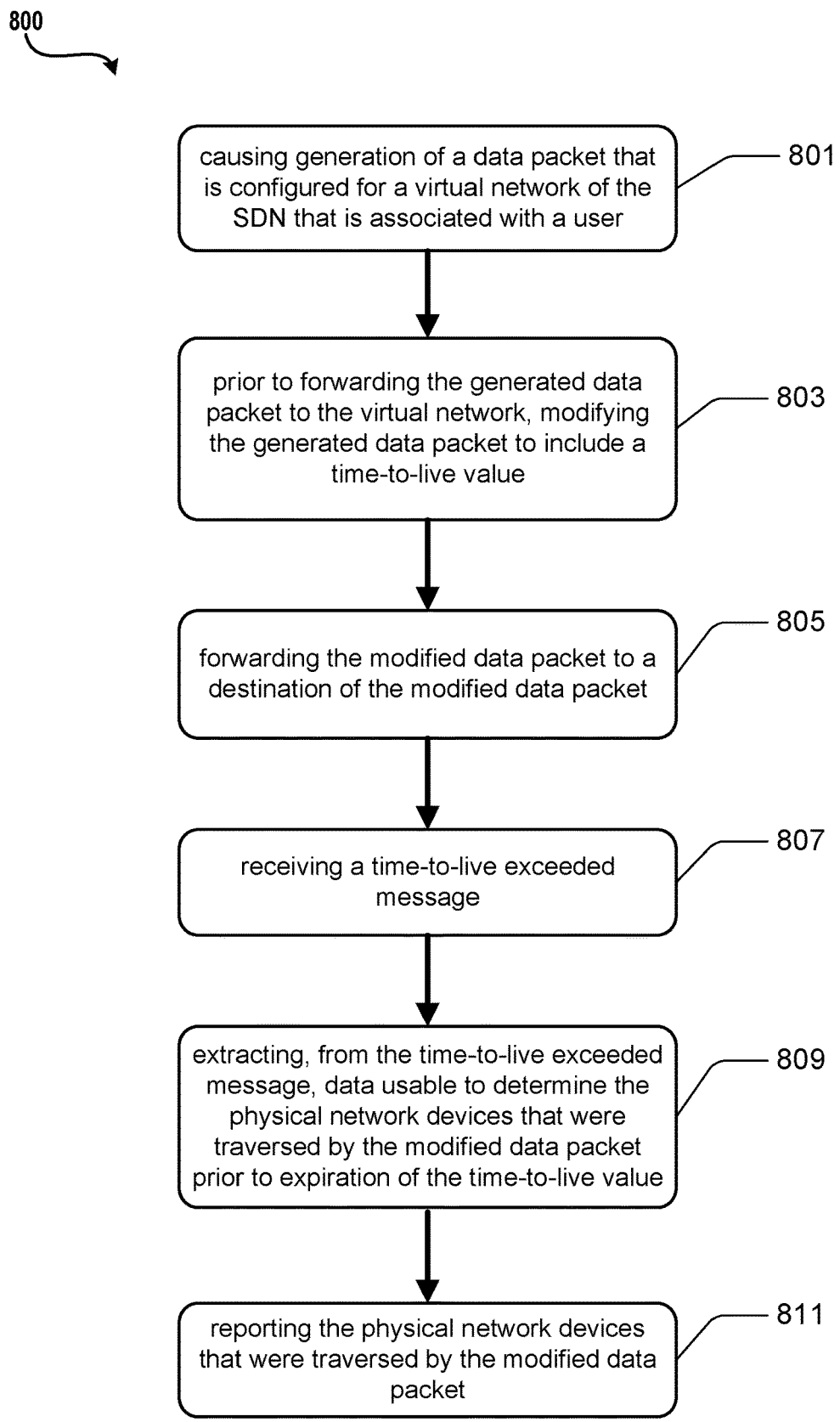
FIG. 8 is a flowchart depicting an example procedure for diagnosing network issues in accordance with the present disclosure.

Referring to FIG. 8, illustrated is another example operational procedure for analyzing a virtual network comprising at least one virtual appliance. Such an operational procedure may provide for identifying faulty links and can be provided by functions illustrated, for example, in FIGS. 1-7. The operational procedure may be implemented in a system comprising one or more computing devices. Referring to FIG. 8, operation 801 illustrates causing generation of a data packet that is configured for a virtual network of the SDN that is associated with a user. In an embodiment, the data packet is generated for analysis of the SDN. The data packet may be generated outside of the normal process for generating outgoing packets. Thus the generated data packet will not carry an actual payload that needs to be delivered to a destination address.

Operation 801 may be followed by operation 803. Operation 803 illustrates prior to forwarding the generated data packet to the virtual network, modifying the generated data packet to include a time-to-live value. In an embodiment, the modified data packet is usable to identify physical network devices that were traversed by the modified data packet. In some embodiments, physical network devices associated with the SDN are configured to examine the modified data packet for the time-to-live value and send a time-to-live exceeded message to a source address of the modified data packet when the time-to-live value has expired. In an embodiment, the time-to-live exceeded message may be modified to include identifiers for the physical network devices.

Operation 803 may be followed by operation 805. Operation 805 illustrates forwarding the modified data packet to a destination of the modified data packet.

Operation 805 may be followed by operation 807. Operation 807 illustrates receiving a time-to-live exceeded message.

Operation 807 may be followed by operation 809. Operation 809 illustrates extracting, from the time-to-live exceeded message, data usable to determine the physical network devices that were traversed by the modified data packet prior to expiration of the time-to-live value.

Operation 809 may be followed by operation 811. Operation 811 illustrates reporting the physical network devices that were traversed by the modified data packet.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 9:
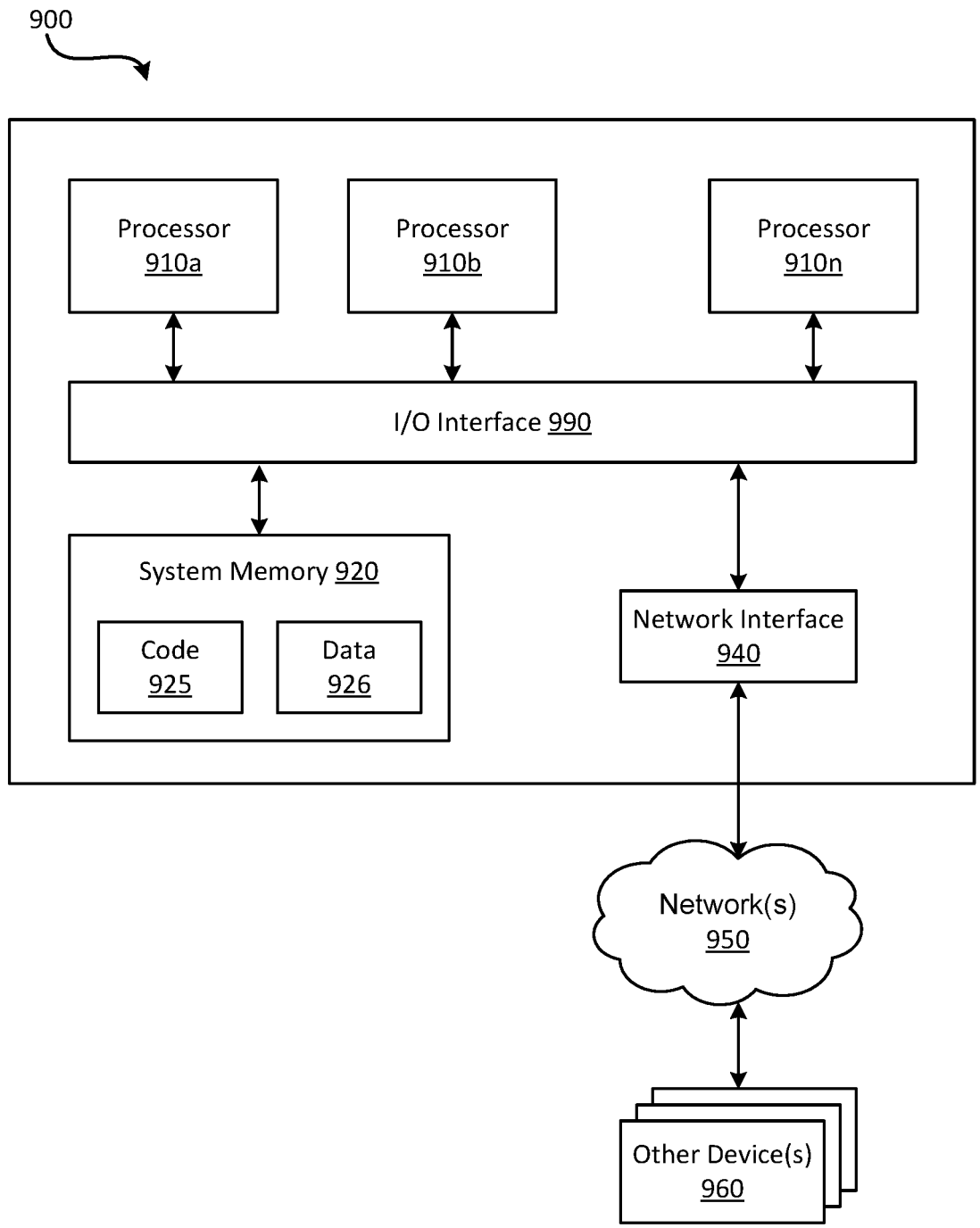
FIG. 9 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 9 illustrates such a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 925 and data 926.

In one embodiment, I/O interface 930 may be configured to coordinate I/O traffic between the processor 910, system memory 920, and any peripheral devices in the device, including network interface 940 or other peripheral interfaces. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or network(s) 950, such as other computer systems or devices as illustrated in FIGS. 1 through 4, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs or via any other suitable type of network and/or protocol.

In some embodiments, system memory 920 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 9, may include other components that are not explicitly shown in FIG. 9, or may utilize an architecture completely different than that shown in FIG. 9.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

EXAMPLE CLAUSES

The disclosure presented herein may be considered in view of the following clauses.

Example Clause A, a method for analyzing a software defined network (SDN), the method comprising:

causing generation of a data packet that is configured for a virtual network of the SDN that is associated with a user, wherein the data packet is generated for analysis of the SDN;

prior to forwarding the generated data packet to the virtual network, modifying the generated data packet to include a time-to-live value, wherein:

the modified data packet is usable to identify physical network devices that were traversed by the modified data packet; and physical network devices associated with the SDN are configured to examine the modified data packet for the time-to-live value and send a time-to-live exceeded message to a source address of the modified data packet when the time-to-live value has expired, the time-to-live exceeded message modified to include identifiers for the physical network devices;

forwarding the modified data packet to a destination of the modified data packet;

receiving a time-to-live exceeded message;

extracting, from the time-to-live exceeded message, data usable to determine the physical network devices that were traversed by the modified data packet prior to expiration of the time-to-live value; and reporting the physical network devices that were traversed by the modified data packet.

Example Clause B, the method of Example Clause A, wherein the source and destination are in the virtual network.

Example Clause C, the method of Example Clause B, wherein the physical network devices include one of a tier 0 or tier 1 networking device.

Example Clause D, the method of any one of Example Clauses A through C, wherein the tier 0 networking device is a top-of-rack switch and the tier 1 networking device is a middle-of-rack switch.

Example Clause E, the method of any one of Example Clauses A through D, wherein the data packet is modified to indicate that the data packet is a modified data packet.

Example Clause F, the method of any one of Example Clauses A through D, wherein the data packet is indicated as a modified data packet via a bit in a header of the data packet.

Example Clause G, the method of any one of Example Clauses A through F, wherein the destination of the modified data packet is a virtual appliance in a path of the modified data packet.

While Example Clauses A through G are described above with respect to a method, it is understood in the context of this disclosure that the subject matter of Example Clauses A through G can additionally or alternatively be implemented as a system, computing device, or via computer readable storage media.

Example Clause H, a method for analyzing a virtual network comprising at least one virtual appliance, the method comprising:

generating a route tracing request packet comprising a time-to-live value, a source address of a source of the route tracing request packet, and an address of a destination of the route tracing request packet, wherein:

the source and destination are in the virtual network;

the route tracing request packet is configured to identify the at least one virtual appliance;

the at least one virtual appliance is configured to examine the route tracing request packet for a time-to-live value indicating that the route tracing request packet has expired and send a time-to-live exceeded message to the source address, the time-to-live exceeded message including an identifier for the at least one virtual appliance;

forwarding the route tracing request packet to the destination;

receiving the time-to-live exceeded message from the at least one virtual appliance;

extracting, from the time-to-live exceeded message, data usable to determine network virtual appliances that were traversed by the route tracing request packet prior to expiration of the time-to-live value; and reporting the network virtual appliances that were traversed by the route tracing request packet.

Example Clause I, the method of Example Clause H, further comprising:

receiving latencies for packet transit between the virtual network appliances; and based on the latencies, determining a presence of a fault.

Example Clause J, the method of Example Clause H or Example Clause I, wherein the route tracing request packet is generated by a network management agent executing on a host for the source address.

Example Clause K, the method of Example Clauses H through Example Clause J, wherein the route tracing request packet is configured to mimic data packets sent from the source address.

Example Clause L, the method of Example Clauses H through Example Clause K, wherein the network virtual appliances comprise one of a load balancer, a firewall, or other virtual appliance.

While Example Clauses H through L are described above with respect to a method, it is understood in the context of this disclosure that the subject matter of Example Clauses H through L can additionally or alternatively be implemented by a computing device, system, or via computer readable storage media.

Example Clause M, a system comprising:

one or more processors; and a memory in communication with the one or more processors, the memory having computer-readable instructions stored thereupon that, when executed by the one or more processors, cause the system to instantiate a virtual appliance in a virtual network, the virtual appliance configured to:

receive a route tracing request packet comprising a time-to-live value, an address of a source of the route tracing request packet, and an address of a destination of the route tracing request packet, wherein:

the source and destination are in the virtual network; and the route tracing request packet is usable to identify the virtual appliance;

examine the route tracing request packet for a time-to-live value indicating that the route tracing request packet has expired and send a time-to-live exceeded message to the source address, the time-to-live exceeded message comprising an identifier for the virtual appliance; and examine the route tracing request packet for a time-to-live value indicating that the route tracing request packet is unexpired, decrement the time-to-live value, modify the route tracing request packet to identify the virtual appliance, and forward the route tracing request packet to a next hop.

Example Clause N, the system of Example Clause M, further comprising modifying the route tracing request packet to include a time when the route tracing request packet was received.

Example Clause O, the system of Example Clause M or Example Clause N, further comprising modifying the route tracing request packet to determine a latency associated with the route tracing request packet.

Example Clause P, the system of Example Clauses M through Example Clause O, wherein the route tracing request packet is generated by a network management agent executing on a host for the source address.

Example Clause Q, the system of Example Clauses M through Example Clause P, wherein the route tracing request packet is configured to mimic data packets sent from the source address.

Example Clause R, the system of Example Clauses M through Example Clause Q, wherein the virtual appliance comprises one of a load balancer or a firewall.

Example Clause S, the system of Example Clauses M through Example Clause R, wherein route tracing request packet is identifiable by network management agents based on an identifier in a header of the route tracing request packet.

Example Clause T, the system of Example Clauses M through Example Clause S, wherein the time-to-live value is determined based in part on congestion control data.

While Example Clauses M through T are described above with respect to a system, it is understood in the context of this disclosure that the subject matter of Example Clauses M through T can additionally or alternatively be implemented as a method, device, or computer-readable medium.

The invention claimed is:

1. A method for analyzing a software defined network (SDN) implementing one or more virtual networks, the method comprising:

causing generation of a data packet that is configured for a virtual network of the SDN that is associated with a user, wherein the data packet is generated for analysis of the SDN;

prior to forwarding the generated data packet to the virtual network, modifying the generated data packet to include a time-to-live value, wherein:

the modified data packet is usable to identify physical network devices that were traversed by the modified data packet in the virtual network; and physical network devices associated with the SDN and in the virtual network are configured to examine the modified data packet for the time-to-live value and send a time-to-live exceeded message to a source address of the modified data packet when the time-to-live value has expired, the time-to-live exceeded message modified to include identifiers for the physical network devices;

forwarding the modified data packet to a destination of the modified data packet in the virtual network;

receiving a time-to-live exceeded message;

extracting, from the time-to-live exceeded message, data usable to determine the physical network devices that were traversed by the modified data packet in the virtual network prior to expiration of the time-to-live value; and reporting the physical network devices that were traversed by the modified data packet in the virtual network.

2. The method of claim 1, wherein the source and destination are in the virtual network.

3. The method of claim 2, wherein the physical network devices include one of a tier 0 or tier 1 networking device.

4. The method of claim 3, wherein the tier 0 networking device is a top-of-rack switch and the tier 1 networking device is a middle-of-rack switch.

5. The method of claim 2, wherein the data packet is modified to indicate that the data packet is a modified data packet.

6. The method of claim 5, wherein the data packet is indicated as a modified data packet via a bit in a header of the data packet.

7. The method of claim 2, wherein the destination of the modified data packet is a virtual appliance in a path of the modified data packet.

8. A method for analyzing a virtual network comprising at least one virtual appliance, the method comprising:

generating a route tracing request packet comprising a time-to-live value, a source address of a source of the route tracing request packet, and an address of a destination of the route tracing request packet, wherein:
the source and destination are in the virtual network;
the route tracing request packet is configured to identify the at least one virtual appliance;
the at least one virtual appliance is configured to examine the route tracing request packet for a time-to-live value indicating that the route tracing request packet has expired and send a time-to-live exceeded message to the source address, the time-to-live exceeded message including an identifier for the at least one virtual appliance;

forwarding the route tracing request packet to the destination;

receiving the time-to-live exceeded message from the at least one virtual appliance;

extracting, from the time-to-live exceeded message, data usable to determine network virtual appliances that were traversed by the route tracing request packet prior to expiration of the time-to-live value; and reporting the network virtual appliances that were traversed by the route tracing request packet.

9. The method of claim 8, further comprising:
receiving latencies for packet transit between the virtual network appliances; and
based on the latencies, determining a presence of a fault.

10. The method of claim 8, wherein the route tracing request packet is generated by a network management agent executing on a host for the source address.

11. The method of claim 8, wherein the route tracing request packet is configured to mimic data packets sent from the source address.

12. The method of claim 8, wherein the network virtual appliances comprise one of a load balancer, a firewall, or other virtual appliance.

13. A system comprising:
one or more processors; and
a memory in communication with the one or more processors, the memory having computer-readable instructions stored thereupon that, when executed by the one or more processors, cause the system to instantiate a virtual appliance in a virtual network, the virtual appliance configured to:
receive a route tracing request packet comprising a time-to-live value, an address of a source of the route tracing request packet, and an address of a destination of the route tracing request packet, wherein:
the source and destination are in the virtual network; and
the route tracing request packet is usable to identify the virtual appliance;
examine the route tracing request packet for a time-to-live value indicating that the route tracing request packet has expired and send a time-to-live exceeded message to the source address, the time-to-live exceeded message comprising an identifier for the virtual appliance; and
examine the route tracing request packet for a time-to-live value indicating that the route tracing request packet is unexpired, decrement the time-to-live value, modify the route tracing request packet to identify the virtual appliance, and forward the modified route tracing request packet to a next hop, the modified route tracing request packet containing data usable to determine and report physical network devices that were traversed by the modified route tracing request packet in the virtual network prior to expiration of the time-to-live value.

14. The system of claim 13, further comprising modifying the route tracing request packet to include a time when the route tracing request packet was received.

15. The system of claim 13, further comprising modifying the route tracing request packet to determine a latency associated with the route tracing request packet.

16. The system of claim 13, wherein the route tracing request packet is generated by a network management agent executing on a host for the source address.

17. The system of claim 13, wherein the route tracing request packet is configured to mimic data packets sent from the source address.

18. The system of claim 13, wherein the virtual appliance comprises one of a load balancer or a firewall.

19. The system of claim 13, wherein route tracing request packet is identifiable by network management agents based on an identifier in a header of the route tracing request packet.

20. The system of claim 13, wherein the time-to-live value is determined based in part on congestion control data.

* * * * *